Figure 1:
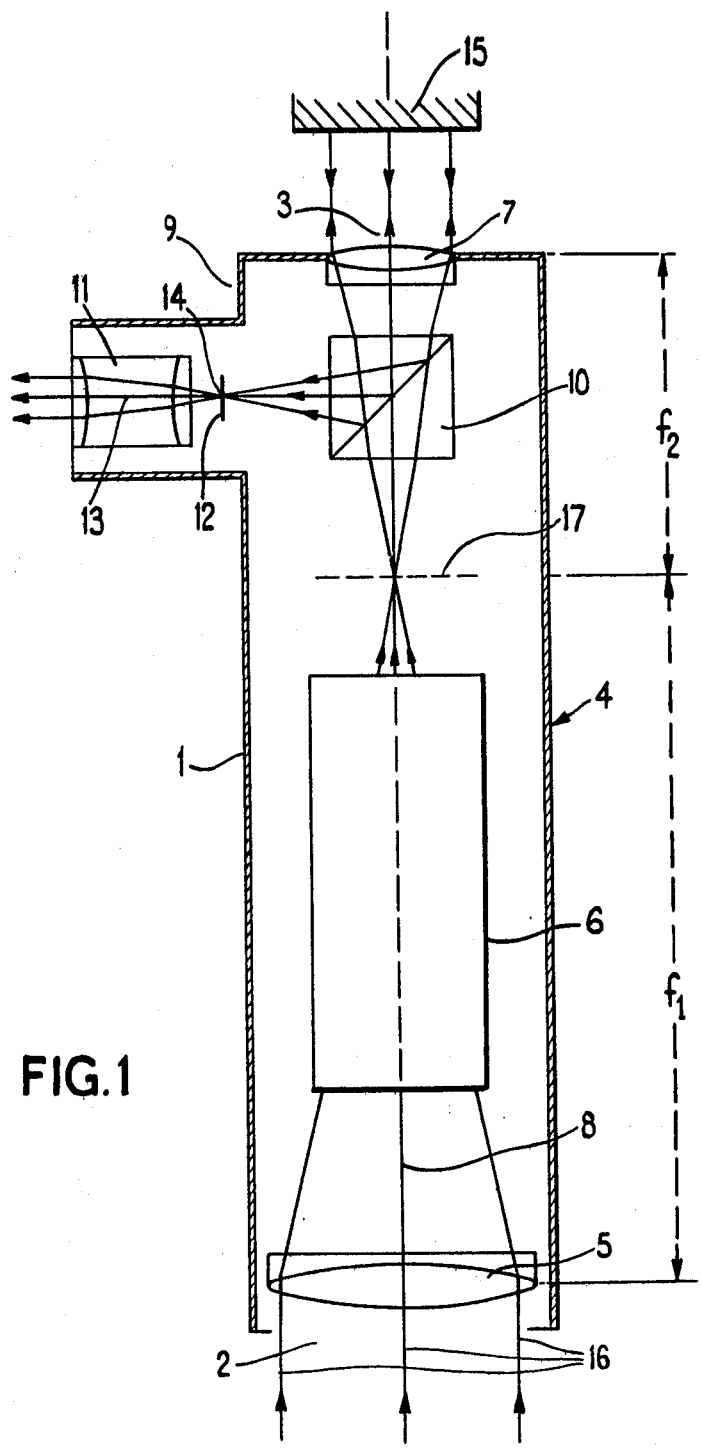

United States Patent [19]

Poole

[11] 4,423,957

[45] Jan. 3, 1984

[54] OPTICAL INSTRUMENTS

[75] Inventor: Joseph Poole, Orpington, England

[73] Assignee: The Secretary of State for Defence in Her Britannic Majesty's Government of the United Kingdom and Great Britain and Northern Ireland, London, England

[21] Appl. No.: 300,353

[22] Filed: Sep. 8, 1981

[30] Foreign Application Priority Data

Sep. 16, 1980 [GB] United Kingdom ............... 8029892

[51] Int. Cl.³ .................... G01B 11/27; B02B 27/32
[52] U.S. Cl. .................... 356/153; 350/562; 356/138; 356/255; 356/371
[58] Field of Search ........ 356/138, 153, 371, 375–376, 356/399, 251–252, 254–255; 350/561–562, 569, 572

[56] References Cited

U.S. PATENT DOCUMENTS

| | | | |
|---|---|---|---|
| 1,012,715 | 12/1911 | Saegmüller | 350/569 |
| 2,402,856 | 6/1946 | Turrettini | 356/153 |
| 2,701,501 | 2/1955 | Cuny | 356/255 |
| 3,049,972 | 8/1962 | Malinowski | 350/569 |
| 3,355,979 | 12/1967 | Wirtanen | 356/399 |
| 3,518,005 | 6/1970 | Weber | 356/399 |
| 3,542,478 | 11/1970 | Dessus | 356/153 |

FOREIGN PATENT DOCUMENTS 507771  4/1976  U.S.S.R. ............... 356/371

OTHER PUBLICATIONS

Anstiss, R., "Optical Alignment Device for Lasers", Optics Technology, 5-1970, pp. 102.

Primary Examiner—William H. Punter
Attorney, Agent, or Firm—Pollock, Vande Sande & Priddy

[57] ABSTRACT

An optical instrument for measuring the divergence of two approximately colinear optical axes comprises an afocal telescope having a comparator disposed transversely to its longitudinal axis, the comparator comprising a beam splitter, an eyepiece and a graticule. The instrument is used in conjunction with a mirror disposed orthogonally with respect to one of the optical axes, the telescope being approximately aligned with the other optical axis and disposed so that light rays passing through it are reflected back by the mirror to the beam splitter and hence to the eyepiece. The instrument is insensitive to small inaccuracies in telescope alignment and is particularly applicable to testing the accuracy of a gun sight, in which application it may be hand held.

10 Claims, 5 Drawing Figures

OPTICAL INSTRUMENTS

This invention relates to optical instruments for providing a view along the normal to the surface of a plane mirror and is particularly applicable to a method and means of testing the sighting accuracy of ordnance.

Optical instruments are known wherein an autocollimator having an objective lens and an eyepiece including an illuminated graticule in the focal plane of the objective lens is used in conjunction with a plane mirror for measuring divergence of axes. The mirror, when positioned in front of the objective lens and orthogonal to the optical axis, produces an image of the graticule at inifinity which is focused in the focal plane of the objective lens such that coincident images of the graticule are viewed through the eyepiece. Angular perturbation of the mirror results in a separation of the graticule images proportional to the angle between the optical axis and the normal to the mirror, the graticule being typically calibrated in angular units. Such instruments have application in precision engineering where for example a plane mirror may be attached to a block slideable over a machined surface, any variation in surface gradient being observable as a perturbation to the mirror.

A disadvantage of such instruments in use is that they must be held in a fixed position relative to the surface to provide a reference axis to which the mirror normal may be referred.

Another application in which the divergence of two optical axes is measured is in the testing of the sighting accuracy of a gun. In one known method, the gun's muzzle receives a boreplug to which is attached a boresight having a telescope mounted parallel to the cylindrical axis of the boreplug. An observer views through the boresight the distant object lying on the telescope's optical axis, as indicated by cross wires in the eyepiece, thus indicating the correct aiming point to which the gunsight should be zeroed.

A disadvantage of such boresights is that they must be accurately aligned with respect to the boreplug and may be difficult to use on guns having muzzle attachments such as muzzle brakes.

The present invention seeks to provide an optical instrument for providing a view along the normal to the surface of a plane mirror which is substantially insensitive to misalignment with the normal.

According to the present invention an optical instrument for providing a view along the normal to the surface of a plane mirror includes an afocal telescope having a first aperture, a first objective lens, a second objective lens and a second aperture mutually disposed along a longitudinal optical axis and having an angular magnification of +2 in the direction, which therefore is positioned in use so that the surface of the plane mirror is adjacent the second aperture and substantially orthogonal to the longitudinal optical axis first-to-second; and a comparator having a beam splitter, an eyepiece and an eyepiece graticule mutually disposed along a transverse optical axis, the beam splitter being located on the longitudinal axis so as to deflect light entering axially through the second aperture from the longitudinal axis to the transverse axis.

In order to achieve the desired magnification, the first objective lens may conveniently have a focal length substantially equal to twice that of the second objective lens and be spaced apart from the second lens by a distance substantially equal to the sum of their focal lengths.

The telescope may further include an image erecting means which may, for example, comprise a pair of image erecting prisms.

The beam splitter preferably comprises a beam splitting prism having a semi-silvered surface and is conveniently of integral construction with the image erecting prisms, all together forming a single prism cluster.

Advantageously the eyepiece graticule has a central pole indicating the position of the transverse optical axis and is graduated to facilitate measurement of radial image displacement from the pole.

The optical instrument is intended for use in conjunction with a planar reflecting surface disposed substantially orthogonally with respect to a first one of the optical axes, the telescope being located with its longitudinal axis in approximate alignment with the second one of the optical axes and with its second aperture confronting the reflecting surface. The selected angular magnification of +2 ensures that light rays transmitted along the said optical axis to the reflecting surface via the telescope will always be returned parallel with the longitudinal axis of the telescope whatever the inclination of the telescope to the optical axis may be.

The optical instrument may be used as a boresight in a method of testing the accuracy of the sight of a gun, which method includes the steps of first inserting into the muzzle a boreplug having a plane mirror orthogonal to the cylindrical axis thereof, directing the gun generally towards a distant object field, holding the optical instrument with its longitudinal optical axis substantially colinear with the cylindrical axis and with its second aperture directed towards the mirror, and finally identifying by observation through the eyepiece of the optical instrument a reference point of the distant object field appearing coincident with the pole of the eyepiece graticule, that reference point being the required aiming point for zeroing the sight.

The optical instrument may conveniently be hand held in use as a boresight, being substantially insensitive to misalignment with respect to the cylindrical axis of the boreplug.

The optical instrument comprising the present invention may also be applied to a method of testing the flatness of a surface along a test line, which method includes the steps of:

first, placing in sliding contact with the surface a sliding block carrying a plane mirror, the mirror being substantially orthogonal to the surface, secondly, placing a collimator in a fixed position relative to the surface whereby collimated light rays from an illuminated reference graticule are directed parallel to the surface and to the test line, thirdly, interposing the optical instrument between the collimator and the mirror with its first aperture directed towards the collimator and the longitudinal optical axis substantially parallel to the collimated light rays, and, finally, observing through the eyepiece the reference graticule image with respect to the eyepiece graticule for a number of positions of the sliding block along the test line.

Figure 2:
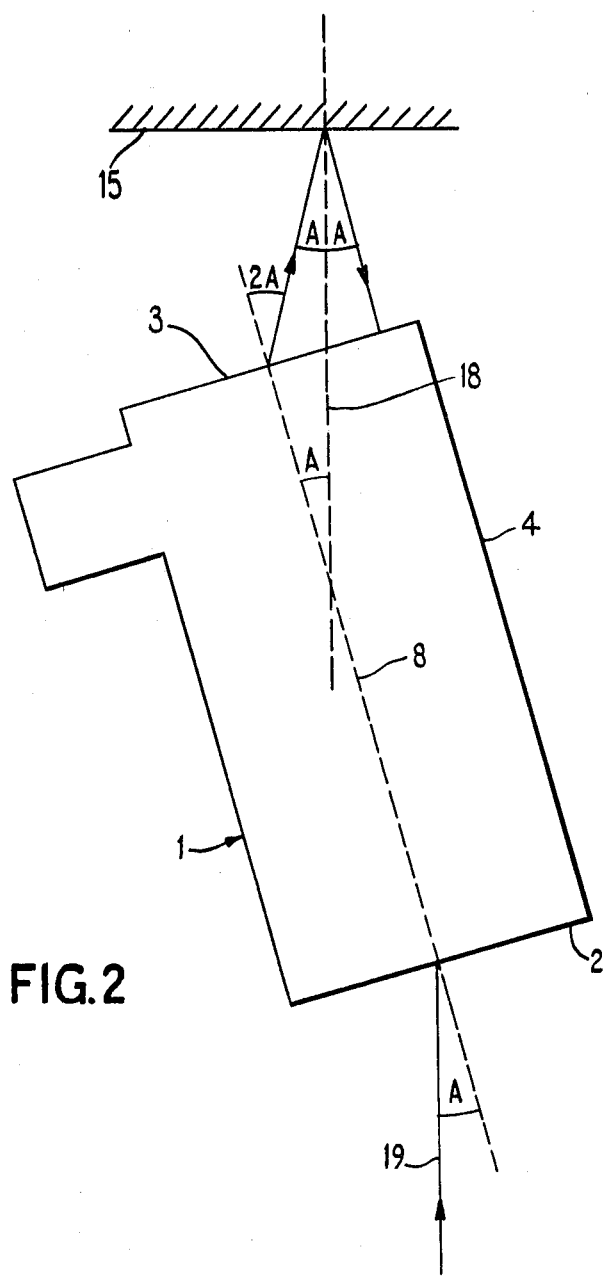
Figure 3:
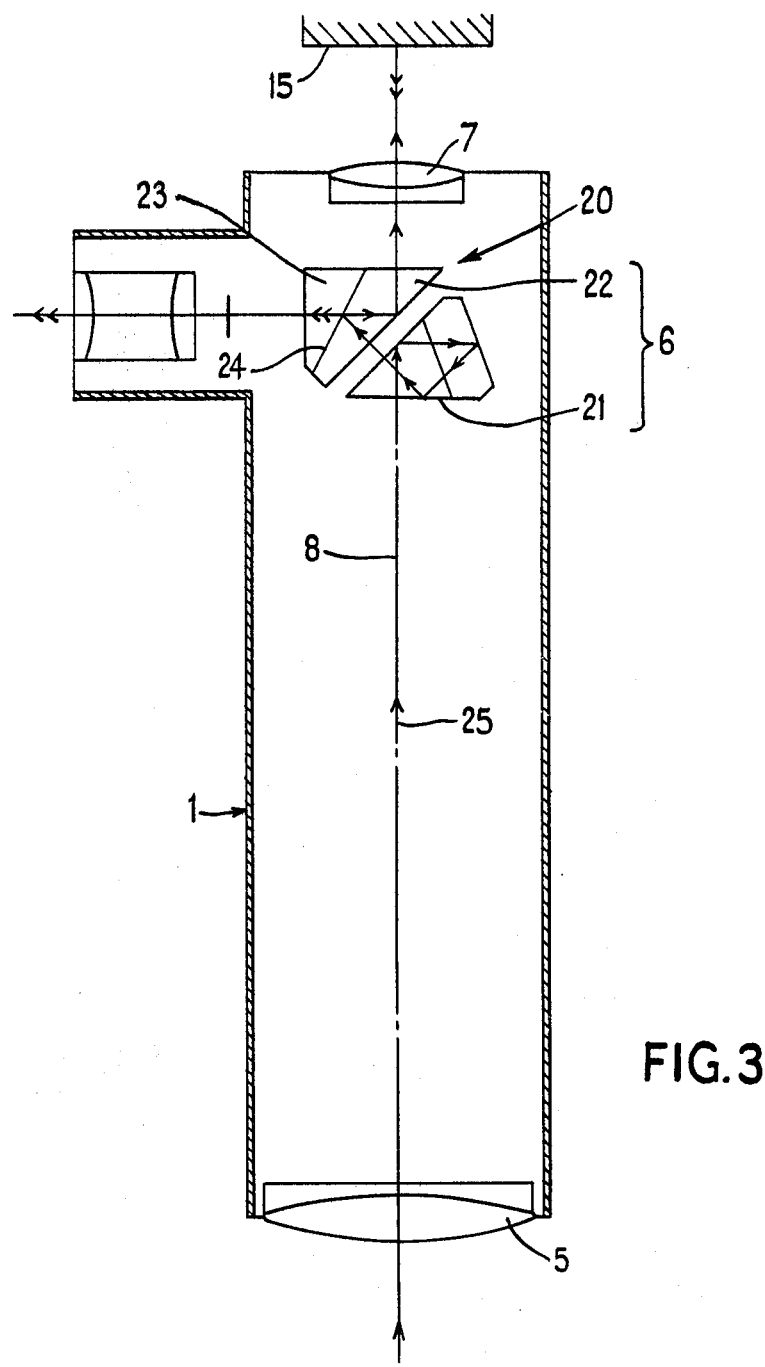
Figure 4:
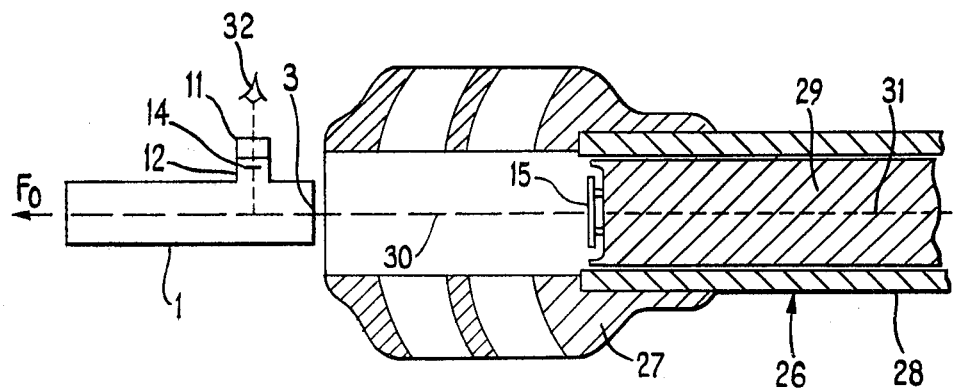
Figure 5:
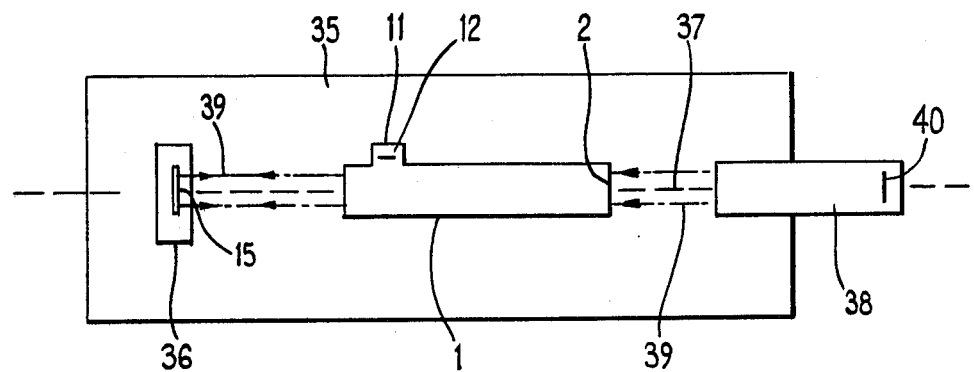

An embodiment of the invention will now be described by way of example only with reference to the accompanying drawings of which:

FIG. 1 is a schematic drawing of the optical instrument illustrated with its longitudinal optical axis disposed orthogonally to a plane mirror, FIG. 2 is a schematic drawing of the optical instrument and mirror of FIG. 1 illustrated with the longitudinal optical axis of the instrument inclined at an angle A to the mirror normal, FIG. 3 is a sectional view of a practical form of the same optical instrument disposed as in FIG. 1, FIG. 4 is a schematic drawing of the same optical instrument in use as a boresight, and FIG. 5 is a plan view of the same optical instrument in use for checking the flatness of a machined surface.

The optical instrument 1 of FIG. 1 has a first aperture 2 and a second aperture 3 both coaxial with a telescope 4 comprising a first objective lens 5 of focal length $f_1$ adjacent the first aperture 2, an image erecting means 6, and a second objective lens 7 of focal length $f_2$ adjacent the second aperture 3, mutually disposed along a longitudinal optical axis 8. The optical instrument further includes a comparator 9 comprising a beam splitter 10, an eyepiece 11, and an eyepiece graticule 12 mutually disposed along a transverse optical axis 13.

The eyepiece graticule 12 is located at the focus of the second objective lens 7 as deflected by the beam splitter 10, and is calibrated to indicate radial image displacement from a pole 14 located on the transverse axis 13. The telescope 4 is afocal, the optical path length between the first objective lens 5 and the second objective lens 7 being equal to $f_1 + f_2$ and the focal length $f_1$ is chosen to be twice $f_2$ whereby, in conjunction with the image erecting means 6, the angular magnification of the telescope 4 is equal to $+2$.

A plane mirror 15 is illustrated adjacent the second aperture 3 and orthogonal to the longitudinal axis 8. In use, parallel light rays 16 originating from a reference point of an illuminated object (not shown) are allowed to enter the instrument through the first aperture 2 parallel to the longitudinal axis 8. These rays 16 come to a focus in the focal plane 17 of the first objective lens 5 and thereafter emerge from the second objective lens 7 once again as parallel rays. After reflection in the mirror 15, the rays re-enter the instrument and are deflected by the beam splitter 10 to be focused at the pole 14 of the eyepiece graticule 12 such that an observer looking into the eyepiece 11 would see the reference point of the illuminated object coincident with the pole 14.

FIG. 2 shows the optical instrument 1 of FIG. 1 in outline and illustrates the effect of tilting the optical instrument with respect to the mirror 15, an angle A being subtended between the longitudinal optical axis 8 and the mirror normal 18. As the instrument has angular magnification of $+2$, a paraxial light ray 19, ie entering the first aperture 2 parallel to the mirror normal 18, emerges from the second aperture 3 at an angle 2A to the longitudinal axis 8 and, after reflection in the mirror 15, re-enters the second aperture 3 parallel to the longitudinal axis 8. Consequently, paraxial light rays received from a reference point of an illuminated object in a direction parallel to the mirror normal 18 are reflected to enter the second aperture 3 parallel to the longitudinal axis 8 to be focused by the comparator at the pole 14 of the eyepiece graticule 12, this being the case for any value of the angle A. There is, however, a maximum value of A to which the optical instrument may be tilted without loss of the image, this angle being determined by the field angle which is set by the use of stops (not shown), the field angle being chosen such that the transmitted rays are paraxial. (The term paraxial rays is here intended to mean those rays immediately surrounding the optical axis for which the approximation sin $u$ = tan $u$ = $u$ may be made where $u$ is the angle between the ray and the optical axis in radians.)

The image erecting means 6 and the beam splitter 10 shown schematically in FIG. 1 are illustrated in greater detail in FIG. 3. The two components are of integral construction together forming a prism cluster 20 comprising image erecting prisms 21 and 22 and a beam splitting prism 23 which has a semisilvered interface 24 with the prism 22. The path of a light ray 25 passing centrally through the first objective lens 5 and the second objective lens 7 and following the longitudinal optical axis is indicated by arrows.

FIG. 4 illustrates a method of zeroing the gunsight of a gun 26 having a muzzle brake 27 and a muzzle 28 in which the optical instrument 1 as hereinbefore described is used as a boresight. According to the method, the muzzle 28 receives a snugly fitting cylindrical boreplug 29 upon which is mounted a plane mirror 15 such that the mirror normal 30 is parallel to the cylindrical axis 31 of the boreplug 29 and hence is also parallel to the axis of the muzzle 28.

The gun 26 is aimed using the gunsight (not shown) towards a distant object field $F_o$ having suitably identifiable reference points (not shown). The optical instrument 1 is then held approximately in line with the muzzle 28 with its second aperture 3 directed towards the mirror 15. An observer 32 viewing through the eyepiece 11 will then see an image of the distant object field $F_o$, the light rays from which are substantially parallel by virtue of their range, and consequently will be able to identify a reference point in the object field whose image is coincident with the pole 14 of the eyepiece graticule 12 and may therefore be presumed to be in line with the mirror normal 30. Assuming the mirror normal 30 to be exactly parallel to the axis of the muzzle 28, the precise aiming point within the object field $F_o$ of the gunsight at zero range setting is then known to be the reference point indicated by the optical instrument 1.

The alignment of the mirror 15 may be checked by turning the boreplug 29 through successive 90 degree intervals and checking the reference point indicated by the optical instrument 1, mirror alignment being adjusted until the reference point remains fixed at the pole.

FIG. 5 illustrates a method of testing the flatness of a machined surface 35. According to the method, a plane mirror 15 is attached to a sliding block 36 slidable over the machined surface 35 along a test line 37. The mirror 15 is positioned orthogonally to the test line 37 and the machined surface 35. As a distant object may not be conveniently used in a workshop, a collimator 38 providing collimated light rays 39 from an illuminated reference graticule 40 is mounted in a fixed position parallel with the test line 37.

The optical instrument 1 is interposed between the mirror 15 and the collimator 38, its first aperture 2 being directed towards the collimator, and the mirror 15 is adjusted until the images of the reference graticule 40 and the eyepiece graticule 12 are coincident as viewed through the eyepiece 11. The sliding block 36 and the mirror 15 are then moved along the test line 37 and any tilting of the sliding block due to variation in gradient of the machined surface 35 will be observed as a vertical separation of the two graticule images. The eyepiece graticule 12 is calibrated in angular units so that a series of measurements at intervals along the test line allow the profile of the machined surface to be mapped.

It will be apparent to those skilled in the art that various other embodiments and applications of the invention are possible. The optical instrument may for example include an image erecting means comprising a lens or combination of lenses as an alternative to prisms.

Other applications of the invention include use of the optical instrument as an optical plummet for vertical alignment, the optical instrument being used in conjunction with a true horizontal mirror such as a trough of mercury to observe a reference point at the top of a tall building in relation to intermediate reference points.

I claim:

1. An optical instrument for providing a view along the normal to the surface of a plane mirror including an afocal telescope having a first aperture, a first objective lens, a second objective lens and a second aperture mutually disposed along a longitudinal optical axis and having an angular magnification of +2 in the first-to-second direction, said telescope being positioned in use so that the surface of the plane mirror is adjacent the second aperture and substantially orthogonal to the longitudinal optical axis; and a comparator having a beam splitter, an eyepiece and an eyepiece graticule mutually disposed along a transverse optical axis, the beam splitter being located on the longitudinal axis so as to deflect light entering axially through the second aperture from the longitudinal axis to the transverse axis.

2. An optical instrument as claimed in claim 1 wherein the first objective lens has a focal length substantially equal to twice that of the second objective lens and the two lenses are spaced apart by distance substantially equal to the sum of their focal lengths.

3. An optical instrument as claimed in claim 1 wherein the telescope further includes an image erecting means.

4. An optical instrument as claimed in claim 3 wherein the image erecting means comprises a pair of image erecting prisms.

5. An optical instrument as claimed in claim 1 wherein the beam splitter comprises a beam splitting prism having a semi-silvered surface.

6. An optical instrument as claimed in claim 1 wherein the eyepiece graticule has a central pole indicative of the transverse optical axis and is radially graduated.

7. A method of testing the accuracy of the sight of a gun using the optical instrument claimed in claim 6, including the steps of
   a. inserting into the muzzle of the gun a boreplug having a plane mirror orthogonal to the cylindrical axis thereof,
   b. directing the gun towards a distant object field,
   c. holding the optical instrument with its longitudinal optical axis approximately colinear with the cylindrical axis and with its second aperture directed towards the mirror, and
   d. identifying by observation through the eyepiece of the optical instrument a reference point of the distant object field appearing coincident with the pole of the eyepiece graticule, that reference point being the required aiming point for zeroing the sight.

8. A method as claimed in claim 7 wherein the optical instrument is hand held.

9. A method of testing the flatness of a surface along a test line using the optical instrument claimed in claim 6, including the steps of
   a. placing in sliding contact with the surface a sliding block carrying a plane mirror, the mirror being substantially orthogonal to the surface,
   b. placing a collimator in a fixed position relative to the surface whereby collimated light rays from an illuminated reference graticule are directed parallel to the surface and to the test line,
   c. interposing the optical instrument between the collimator and the mirror with its first aperture directed towards the collimator and the longitudinal optical axis approximately parallel to the collimated light rays,
   d. observing through the eyepiece the reference graticule image with respect to the eyepiece graticule for a number of positions of the sliding block along the test line.

10. An optical instrument as claimed in claim 1 wherein the telescope further includes an image erecting means comprising a pair of image erecting prisms, and wherein the beam splitter comprises a beam splitting prism having a semisilvered surface, the beam splitting prism and the image erecting prisms being integrally constructed as a single prism cluster.

* * * * *